United States Patent
Hsu

(10) Patent No.: US 10,825,317 B2
(45) Date of Patent: Nov. 3, 2020

(54) METHOD FOR AVOIDING MISJUDGMENT DURING HUMAN FALL DETECTION AND APPARATUS THEREOF

(71) Applicant: HONEYWLD TECHNOLOGY CORP., Hsinchu (TW)

(72) Inventor: Jen-Chien Hsu, Hsinchu (TW)

(73) Assignee: HONEYWLD TECHNOLOGY CORP., Hsinchu (TW)

( * ) Notice: Subject to any disclaimer, the term of this patent is extended or adjusted under 35 U.S.C. 154(b) by 270 days.

(21) Appl. No.: 16/028,767

(22) Filed: Jul. 6, 2018

(65) Prior Publication Data
US 2020/0013272 A1 Jan. 9, 2020

(51) Int. Cl.
*G01P 21/00* (2006.01)
*G08B 21/04* (2006.01)

(52) U.S. Cl.
CPC .......... *G08B 21/0446* (2013.01); *G01P 21/00* (2013.01)

(58) Field of Classification Search
CPC ............................ G08B 21/0446; G01P 21/00
See application file for complete search history.

(56) References Cited

PUBLICATIONS

Wu et al., Development of a Wearable-Sensor-Based Fall Detection System, 2015, International Journal of Telemedicine and Applications, vol. 2015, Article ID 576364, Hindawi Publishing Corporation, 11 pp. (Year: 2015).*

* cited by examiner

*Primary Examiner* — Toan M Le
(74) *Attorney, Agent, or Firm* — Li & Cai Intellectual Property (USA) Office

(57) ABSTRACT

The disclosure is related to a method for avoiding misjudgment when detecting a human fall, and an apparatus thereof. When the apparatus worn on a person generates a collision signal, it determines if the apparatus was in a proper status in the past period of time before the collision according to the acceleration data. The apparatus was in the proper status if a specific axial direction of an accelerometer of the apparatus is substantially parallel with the direction of gravity, and the method goes on detecting the human fall; otherwise, the process is terminated. The acceleration data before and after the collision is compared with fall conditions set by a fall detection program. A fall event is determined if the acceleration data meets the fall conditions.

9 Claims, 7 Drawing Sheets

METHOD FOR AVOIDING MISJUDGMENT DURING HUMAN FALL DETECTION AND APPARATUS THEREOF

BACKGROUND OF THE INVENTION

1. Field of the Invention

The disclosure is related to a technology to detect a fall of a person, and in particular to a method for avoiding misjudgment while using an apparatus to detect a human fall of a person wearing the apparatus.

2. Description of Related Art

Human fall detection is one of the major issues in a healthcare system. The fall detection technology is a developing technology in the field of healthcare that can be implemented in a care system for the elderly, infirmed, or disabled population.

Conventional fall detection technology generally utilizes a portable device that is worn on the person under care of the care system. The portable device is such as a wristband or a necklace with sensors for monitoring fall actions of the person who is especially a member of the elderly population. In particular, in order to detect the fall, the portable device worn on the person under care is required to be in operation continuously for constantly issuing detection signals to the care system.

For example, in the conventional technology, the portable device, e.g. the wristband or the necklace, utilizes sensors such as an accelerometer and a gyroscope to detect a fall action when the person who wears the portable device falls. In general, the accelerometer measures a change of acceleration, e.g. a change of velocity toward the center of Earth due to the Earth's gravity. When the change of acceleration exceeds a threshold set by the care system, a fall signal will be generated.

Further, the accelerometer can also detect a collision event by recognizing a large acceleration of the portable device. By these features, the conventional care system can accurately recognize the fall action of the person under care. The system issues an alarm when it receives a fall signal, a collision signal and a final rest signal from the portable device in sequence.

For example, the conventional fall detection process is generally based on a change of an acceleration value with time. The acceleration value is computed from data generated by an accelerometer disposed in the device worn by the person under care. Reference is made to FIG. 1, which shows a chart illustrating a trend of an acceleration value a(t) with time t. In the fall detection process, a fall event is detected as a fall state when the acceleration value a(t) approaches zero (free fall), a collision state when the acceleration value a(t) increases rapidly, and a rest state when the acceleration value a(t) is maintained at a stable value in the trend of the acceleration value a(t) with time t.

Since the sensor, e.g. the accelerometer, disposed in the portable device is sensitive, any big change of acceleration may easily be determined as a fall event. However, the care system with the portable device for detecting a fall event should obviate the possibility of any mistake produced by erroneous judgment of the portable device under certain situations.

SUMMARY OF THE INVENTION

The disclosure is related to a method for avoiding misjudgment of an apparatus worn on a person under care when detecting a fall. A fall event detected by the apparatus with a sensor, e.g. an accelerometer, may be an erroneous message that causes a system to make a wrong judgment when depending only on the acceleration sensed by the sensor. For example, when the apparatus with the accelerometer is taken off from the body of the person wearing the apparatus and thrown onto a table, a great acceleration value generated by the sensor of the apparatus will generally be regarded as a fall event. These kinds of error messages may cause the system that provides emergency aid to the person who wears the apparatus to waste a lot of resources to handle the false alarm.

According to one aspect of the invention, a method for avoiding misjudgment when detecting a human fall is provided. In the method, the apparatus worn on a person under care of a healthcare system continuously detects if a collision signal is generated. The collision signal is generated if an accelerometer senses a large change of the acceleration value. After receiving the collision signal when the accelerometer determines that a current acceleration value is larger than a first threshold, by a processor of the apparatus, the acceleration data in a past period of time before the collision signal, e.g. 1 second before the collision, is evaluated to determine whether or not the apparatus is in a proper status in the past period of time according to the acceleration data.

If the apparatus is determined to be in the proper status, the process executed by the processor compares the previous acceleration data before the collision and the acceleration data after the collision with fall conditions set by a fall detection program. A fall event raises an alarm if the acceleration data meets the fall conditions. Otherwise, if the apparatus is determined not to be in the proper status, the collision signal will be ignored and the process will be terminated.

In one embodiment, in the step for determining if the apparatus is in the proper status, an acceleration value is calculated from the acceleration data in the past period of time and compared with a acceleration vector component in the direction of a reference axis that points to the center of Earth so as to determine if the apparatus is correctly worn on the person, i.e., points to the center of Earth. The apparatus is in the proper status if a difference between the acceleration value and the acceleration vector component in the direction of the reference axis is smaller than a second threshold. In an exemplary example, the mentioned accelerometer is a three-axis accelerometer that is used to measure three acceleration vector components in three axial directions, and the apparatus is determined to be in the proper status if a specific axial direction is substantially parallel with the direction of gravity.

In one further embodiment of the disclosure, in the step for determining if the apparatus is in the proper status, three acceleration vector components are acquired from the acceleration data in the past period of time before the collision, and the apparatus is determined to be in the proper status if a vector difference between the acceleration vector and a reference vector is smaller than a third threshold.

According to one further aspect of the invention, an apparatus for human fall detection capable of avoiding misjudgment when detecting a human fall is provided. The apparatus includes a processor, a sensor unit that can be an accelerometer used to measure acceleration data correlated to the apparatus, and a memory unit. The memory unit is used to store instructions that are executed by the processor for performing the method described above for avoiding misjudgment when detecting a human fall.

These and other advantages and aspects of the invention will become apparent to those skilled in the art upon a reading of the following detailed description of the invention, in conjunction with the accompanying drawings.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure describes an apparatus and a method for avoiding misjudgment when detecting a human fall. The apparatus is such as a portable device provided for a person to conduct fall detection. The apparatus includes a sensor such as an accelerometer that is used to measure acceleration of the apparatus, or a gyroscope for measuring an orientation and angular velocities thereof. For example, the sensor can be a three-axis accelerometer that is used to measure three acceleration vector components in three axial directions, e.g. three acceleration vector components in X-axis, Y-axis and Z-axis directions. An acceleration value can be calculated according to the acceleration vector components. It is well known that a magnitude of the three-axial vector is equal to a square root of a sum of squares of each of the vector components.

One of the objectives of the invention is to avoid misjudgments during the process of human fall detection through detecting if the apparatus is correctly worn on the person. The apparatus may render a wrong message that should be ignored if the apparatus is not correctly worn on the person.

Figure 1:
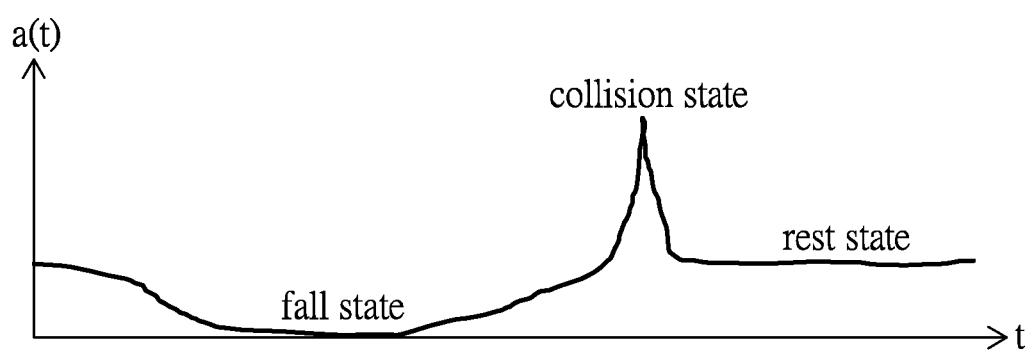
FIG. 1 shows a chart illustrating a trend of acceleration value a(t) with time in a conventional fall detection process.
Figure 2:
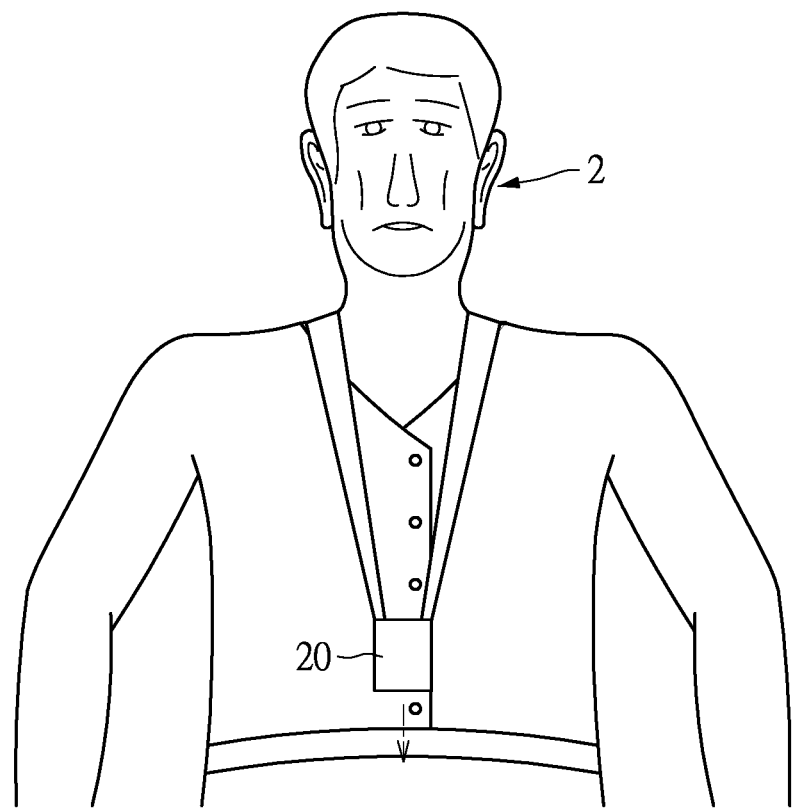
FIG. 2 shows a graphical representation of a person wearing an apparatus with a sensor used to detect a fall event in one embodiment of the disclosure.

FIG. 2 shows a graphical representation of a person wearing an apparatus with a sensor used to detect a human fall event in one embodiment of the disclosure. An apparatus 20 shown in the figure is worn by a person 2. The person 2 can be a person under care or a patient wearing the apparatus 20 that is used to detect any falling motion. For example, the apparatus 20 includes a sensor such as an accelerometer. The accelerometer measures an acceleration value of a device. The acceleration value is a rate of change of velocity and can be divided into three component values along the three axial directions. When the device is stationary, e.g. resting on a surface of a table, the accelerometer inside measures a value around an acceleration of gravity due to Earth's gravity (g~9.81 m/s$^2$). On the contrary, the accelerometer measures a zero value when the device is in free fall.

Figure 3:
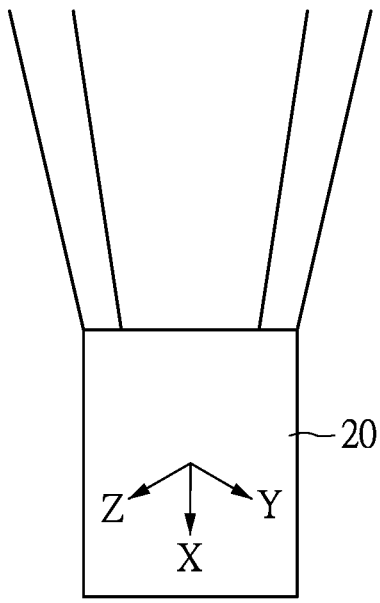
FIG. 3 shows a schematic diagram depicting three accelerometer axes of the sensor of the apparatus according to one embodiment of the disclosure.

FIG. 3 shows a schematic diagram depicting three accelerometer axes of the sensor of the apparatus according to one embodiment of the disclosure. The apparatus 20 includes an accelerometer that can instantly generate acceleration values along three axial directions, e.g. X, Y, Z, that are orthogonal to each other. The acceleration values can be described by three acceleration vector components ($a_x$, $a_y$, $a_z$ in equation 1) as shown in the diagram. The diagram shows that the accelerometer is configured to specify one of the coordinate axes to be a reference axis that points to the center of Earth. In an exemplary example, the X-axis is exemplified as the direction that is configured to be substantially parallel with the direction of gravity. Therefore, the state of the coordinate axes can be used to determine if the apparatus is in a proper status. In the present example, the apparatus 20 is at proper status if an acceleration value along the X-axis measured by the accelerometer is around the acceleration of gravity since the direction of the X-axis is substantially parallel with the direction of gravity.

The accelerometer measures the three vector components ($a_x$, $a_y$, $a_z$) in the directions of the three axes (X, Y and Z). In equation 1, an acceleration value ($a_{total}$) can be obtained by evaluating a square root of the sum of squares of the three acceleration vector components ($a_x$, $a_y$, $a_z$).

$$a_{total} = \sqrt{a_x^2 + a_y^2 + a_z^2} \qquad \text{(Equation 1)}$$

Further, in equation 2, the apparatus of the disclosure determines whether or not the apparatus is in the proper status by comparing a difference $a_{diff1}$ between the acceleration value ($a_{total}$) and the acceleration vector component in the direction of the X-axis ($a_x$) and a second threshold $a_{th2}$ that is introduced to be a reference for evaluating the status of the apparatus.

$$a_{diff1} = a_{total} - a_x < a_{th2} \qquad \text{(Equation 2)}$$

Figure 4:
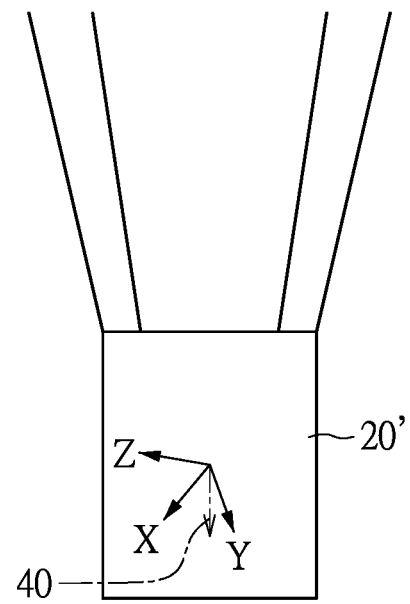
FIG. 4 shows another diagram depicting three accelerometer axes and a reference vector of the sensor in another embodiment of the disclosure.

However, no matter whether any axial direction of the accelerometer inside the apparatus is specified to point to the center of Earth, a reference vector can still be designated to be parallel with the direction of gravity. FIG. 4 shows another diagram depicting three accelerometer axes of the sensor in another embodiment of the disclosure.

Different from the embodiment shown in FIG. 3, in which the X-axis of the accelerometer is configured to point toward to the center of Earth, none of any of the three axial directions of the accelerometer inside the apparatus 20' shown in the present embodiment is specified as pointing to the center of Earth. Nonetheless, a reference vector 40 toward the center of Earth in the coordinate system can still be specified. The reference vector 40 is specified according to the acceleration vector components over the three axial directions when the apparatus 20' rests vertically. Therefore, the reference vector 40 can act as the reference for determining if the apparatus 20' is correctly worn on the person. The apparatus is preferably in the form of a necklace that can hang naturally down and point to the center of Earth when in operation for fall detection.

In the present embodiment, the reference vector 40 is specified by measuring three acceleration vector components ($a_{xref}$, $a_{yref}$ and $a_{zref}$) when the apparatus 20' rests vertically. In equation 3, another threshold, i.e. a third threshold ($a_{th3}$), is introduced to be a reference to evaluate the status of the apparatus by comparing with another difference ($a_{diff2}$). This difference ($a_{diff2}$) is obtained by evaluating a square root of the sum of squares of three differences between the acceleration vector components ($a_x$, $a_y$, $a_z$) and three corresponding reference vector components ($a_{xref}$, $a_{yref}$ and $a_{zref}$).

$$a_{diff2} = \sqrt{(a_x - a_{xref})^2 + (a_y - a_{yref})^2 + (a_z - a_{zref})^2} < a_{th3} \quad \text{(Equation 3)}$$

Figure 5:
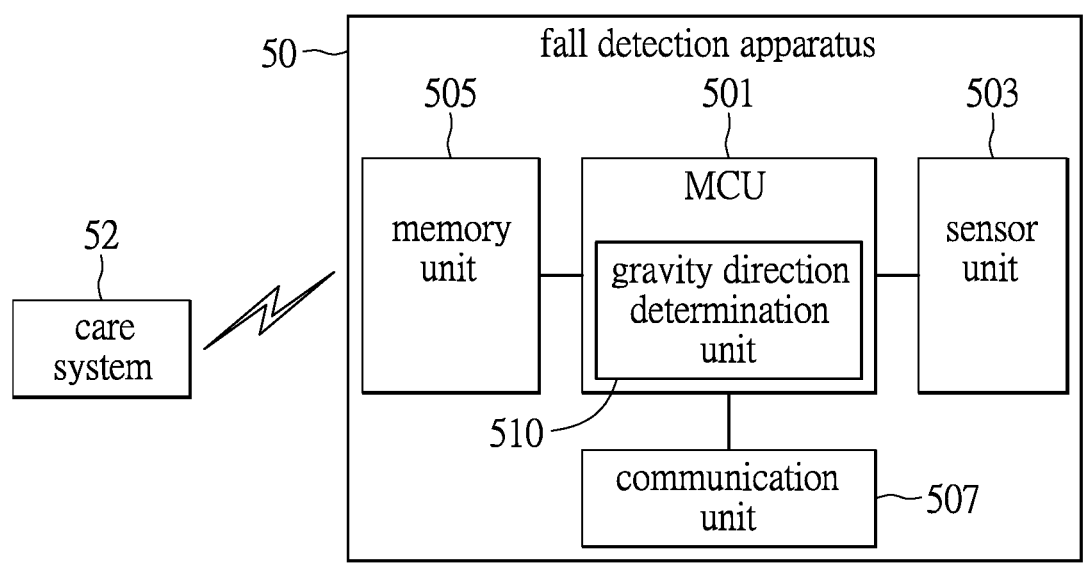
FIG. 5 shows a block diagram depicting the main circuits of the apparatus for avoiding misjudgment when performing a fall detection according to one embodiment of the disclosure.

FIG. 5 shows a block diagram depicting the main circuits of the apparatus for human fall detection according to one embodiment of the disclosure.

A fall detection apparatus 50 is illustrated in the diagram. The apparatus 50 is such as a portable device worn on a person under care. For example, the portable device utilizes a sensor provided therein such as an accelerometer to sense the movement of the person. The portable device is preferably in the form of necklace that includes a processor executing a fall detection program when in operation.

This apparatus 50 includes a processor that can be a micro-processor, e.g. the shown MCU 501, for processing data generated by a sensor unit 503. The sensor unit 503 can be exemplified as an accelerometer that is operatively coupled with the MCU 501, and is used to measure acceleration data correlated to the apparatus 50. In an exemplary example, the accelerometer installed in the apparatus 50 is such as a three-axis accelerometer that is used to measure three acceleration vector components in three axial directions. The acceleration value that is calculated according to the three acceleration vector components is a square root of a sum of squares of each of the acceleration vector components.

In the present embodiment, the MCU 501 has a software-based gravity direction determination unit 510 that is used to determine if the apparatus 50 is in a proper status. For example, the apparatus 50 is in the proper status if a specific axial direction or a reference vector of the accelerometer inside the apparatus 50 is substantially parallel with the direction of gravity.

The apparatus 50 includes a memory unit 505 that is operatively coupled with the MCU 501. The memory unit 505 generally acts as a system memory of the apparatus 50, and in particular stores a fall detection program that is executed by the MCU 501 for performing the method for human fall detection that is capable of avoiding misjudgment by detecting the status of the apparatus. In one further embodiment of the disclosure, the apparatus 50 includes a communication unit 507 that is operatively coupled with the MCU 501 and is used to communicate with a care system 52. When the apparatus 50 detects a fall event by the method for human fall detection, an alarm is generated and transmitted to the care system 52 through the communication unit 507.

Figure 6:
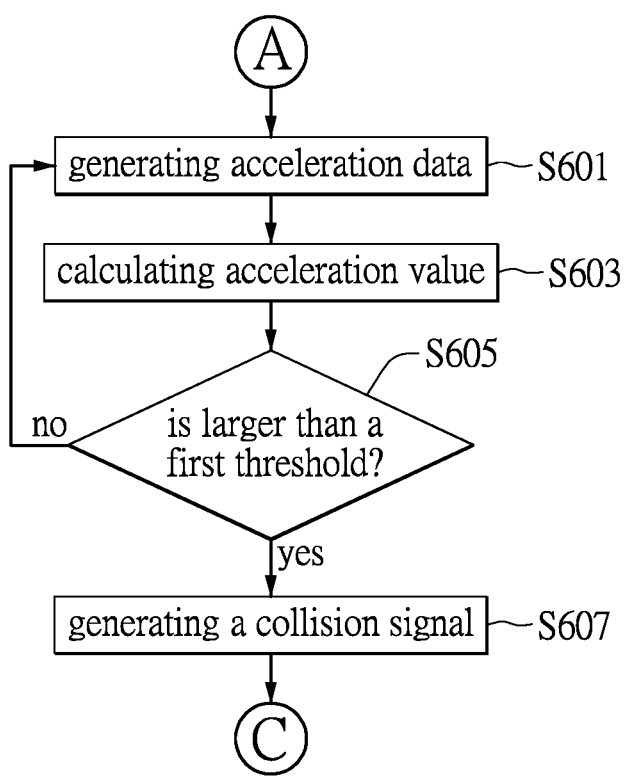
FIG. 6 shows a flow chart describing a process of generating a collision signal in the method for avoiding misjudgment when performing fall detection in one embodiment of the disclosure.

FIG. 6 shows a flow chart describing a process of generating the collision signal in the method according to one embodiment of the disclosure. In this process (A), in step S601, the sensor of the apparatus worn on a person under care continuously generates acceleration data, e.g. the acceleration vector components in three axial directions (the vector values). In step S603, the acceleration data is such as a raw data generated by the sensor and is provided to calculate an acceleration value for determining if any collision event has occurred.

In step S605, in the sensor, it is determined whether or not the acceleration value is larger than a first threshold. It should be noted that the first threshold is set by the system for determining if any collision event is detected. The collision signal is generated (step S607) by the sensor and optionally goes to a process (C) described in FIG. 7 when the sensor determines that the acceleration value is larger than this first threshold. Otherwise, the process goes back to step S601 if the acceleration value is not larger than the first threshold.

Figure 7:
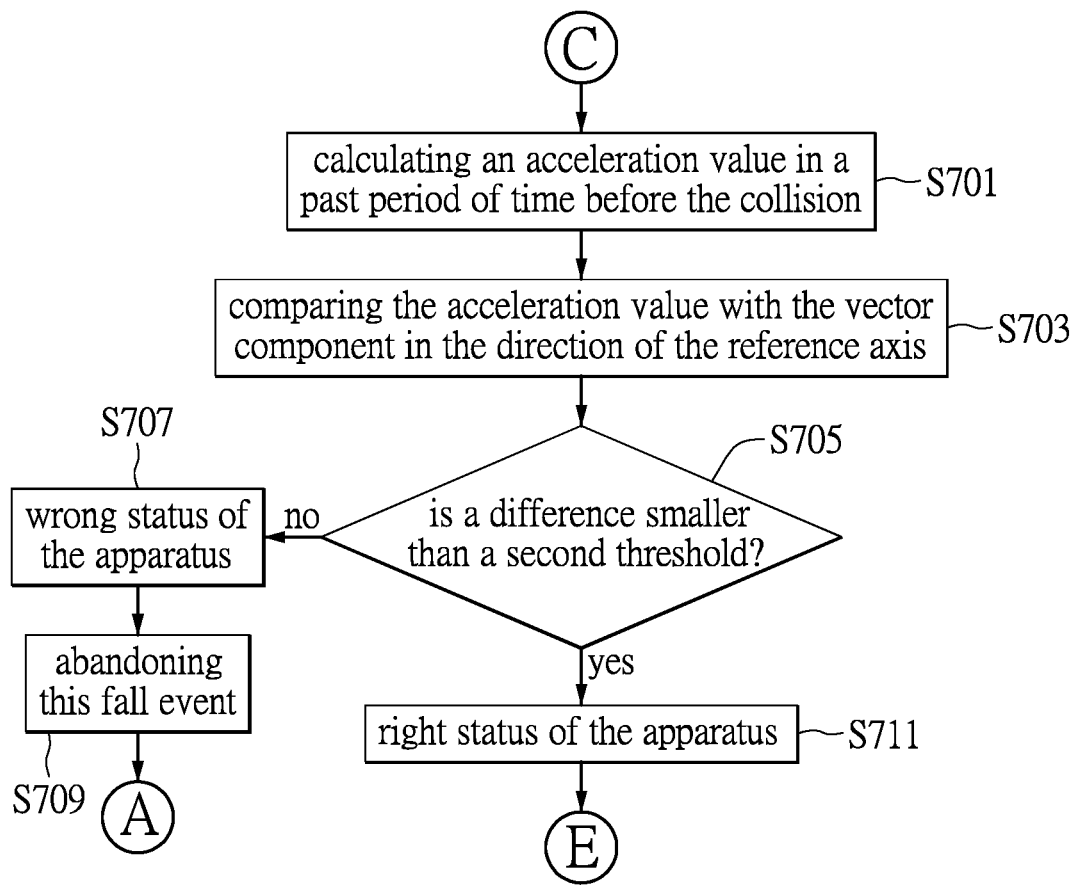
FIG. 7 shows a flow chart describing a process for confirming a status of the apparatus in a past period of time before the collision in the method for avoiding misjudgment according to one embodiment of the disclosure.

FIG. 7 shows a flow chart describing a process (C) for confirming a status of the apparatus in a past period of time in the method for avoiding misjudgment according to one embodiment of the disclosure.

After receiving the collision signal that is generated (in process (A)) by the accelerometer of the apparatus when the accelerometer determines that a current acceleration value calculated from current acceleration data is larger than the first threshold, in step S701, an acceleration value that can be a square root of a sum of squares of each of the three acceleration vector components in the past period of time before the collision is calculated. In step S703, the acceleration value is compared with the vector component in the direction of the reference axis that points to the center of Earth, so as to compute a difference there-between. This comparison between the acceleration value and the vector component in the direction of the reference axis is used to confirm whether the apparatus correctly points to the center of Earth. It should be noted that the difference is small in principle when the apparatus hangs naturally down and a specific coordinate axis substantially points to the center of Earth.

Next, the process executed by the processor determines if the apparatus is in a proper status in the past period of time. In step S705, it is determined that whether or not the difference is smaller than a second threshold, as referring to the equation 2. If the difference is not smaller than the second threshold, it determines that the apparatus is in a wrong status in the past period of time (step S707), and abandons this "fall event" detected based on the collision signal generated by the accelerometer (S709). This means that the collision signal in this fall event will be ignored if the apparatus is determined not to be in the proper status. The process then goes back to the process (A) described in FIG. 6.

If the difference is found to be smaller than the second threshold in step S705, it is determined that the current acceleration data is valid due to the apparatus being at proper status in the past period of time (step S711). The process continues with the steps in the process (E) described in FIG. 9.

Figure 8:
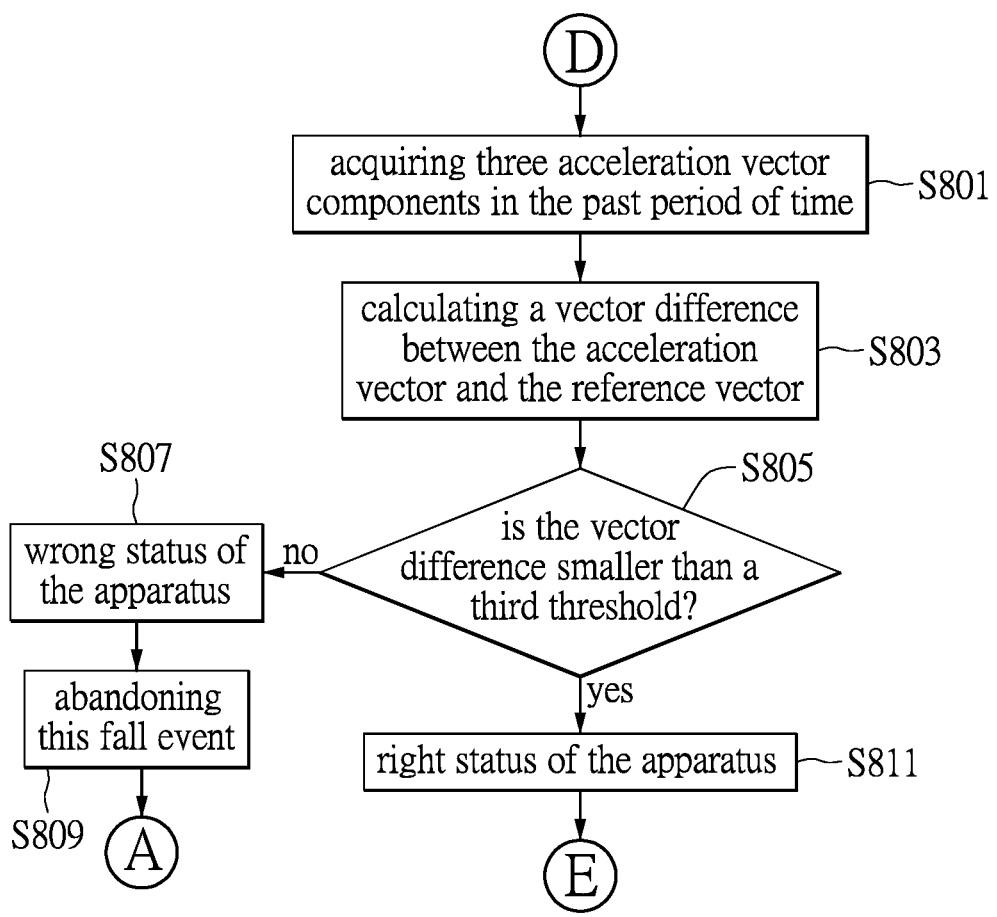
FIG. 8 shows another flow chart describing a process for confirming a status of the apparatus in a past period of time before the collision in the method for avoiding misjudgment according to another embodiment of the disclosure.

FIG. 8 shows another flow chart describing a process (D) for confirming a status of the apparatus in a past period of time before the collision in the method according to another embodiment of the disclosure.

When the processor of the apparatus receives the collision signal generated by the accelerometer, the processor acquires three acceleration vector components in the past period of time before the collision (step S801). After that, in step S803, a vector difference between the acceleration vector and the reference vector that points to the center of Earth can be calculated, as referring to the equation 3. It should be noted that the reference vector refers to a vector substantially toward the center of Earth even though none of any axial direction of the coordinate system built in the accelerometer is configured to point to the center of Earth. This vector difference between the acceleration vector and the reference vector is used to confirm whether the apparatus correctly points to the center of Earth.

In step S805, the process executed by the processor determines if the vector difference is smaller than a third threshold. If the vector difference is not smaller than the third threshold, the apparatus is determined to be in the wrong status (step S807), and this "fall event" detected based on the collision signal can be abandoned (S809). The apparatus is determined to be in the proper status if the vector difference is smaller than the third threshold (step S811). The process also continues with the steps in the process (E) described in FIG. 9.

According to the embodiment described in either FIG. 7 or FIG. 8, it is determined if the apparatus with the accelerometer is in the proper status in the past period of time before the moment the collision signal is generated by the accelerometer. The determination of the wrong status of the apparatus allows the apparatus to avoid misjudgment and terminate the fall detection process.

Figure 9:
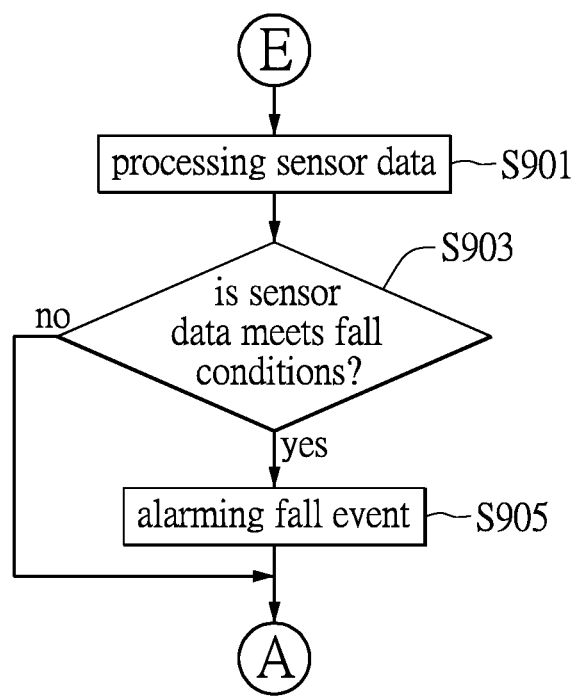
FIG. 9 shows a flow chart describing a fall detection process in the method according to one embodiment of the disclosure.

If the apparatus is determined to be in the proper status, the process (E) described in FIG. 9 is performed for detecting a human fall. FIG. 9 shows a flow chart describing a process of fall detection in the method according to one embodiment of the disclosure.

In step S901 of the process (E), the processor processes sensor data generated by the accelerometer before and after the collision. In step S903, the processor determines if the sensor data meets fall conditions set by a fall detection program. It should be noted that these fall conditions set by the fall detection program are used to confirm a fall event detected by the apparatus. A fall event is confirmed and an alarm is raised (step S905) when the sensor data meets the fall conditions; otherwise, the process can be returned to the original process (A).

In sum, according to the above embodiments of the apparatus and method for avoiding misjudgment when detecting a human fall, misjudgments in the process for detecting human fall can be avoided by determining if the apparatus worn on the person is in a proper status, for example, if a specific axial direction of the sensor inside the apparatus is substantially parallel with the direction of gravity. Therefore, the determination of the status of the apparatus in a past period of time can be used to avoid misjudgments and also reduce unnecessary consumption of power of the apparatus.

It is intended that the specification and depicted embodiments be considered exemplary only, with a true scope of the invention being determined by the broad meaning of the following claims.

What is claimed is:

1. A method for avoiding misjudgment when detecting a human fall, comprising:

in an apparatus having a micro-processor, an accelerometer determining that a current acceleration value calculated from current acceleration data is larger than a first threshold and generating a collision signal; wherein the apparatus is a portable device worn on a person under care and the accelerometer is used to generate the acceleration data correlated to the apparatus;

determining if the apparatus is in a proper status in a past period of time by comparing an acceleration value, which is calculated from the acceleration data in the past period of time before the collision signal is generated, with a vector component in a direction of a reference axis; wherein three acceleration vector components are acquired from the acceleration data in the past period of time before the collision;

wherein the apparatus is determined in the proper status if a difference between the acceleration value and the vector component in the direction of the reference axis is smaller than a second threshold, or the apparatus is determined in the proper status if a vector difference between the acceleration vector and a reference vector is smaller than a third threshold, and determines if the acceleration data before and after the collision meets fall conditions set by a fall detection program; and an alarm for a fall event is issued if the acceleration data meets the fall conditions; and the collision signal is ignored if the apparatus is determined not to be in the proper status.

2. The method as recited in claim 1, wherein the accelerometer is a three-axis accelerometer that is used to measure three acceleration vector components in three axial directions, and the acceleration value is calculated according to the three acceleration vector components.

3. The method as recited in claim 1, wherein the comparison between the acceleration value and the vector component in the direction of the reference axis is used to confirm whether the apparatus correctly points to the center of Earth.

4. The method as recited in claim 1, wherein the reference vector refers to a vector substantially toward the center of Earth when the apparatus rests vertically, and the vector difference between the acceleration vector and the reference vector is used to confirm whether the apparatus correctly points to the center of Earth.

5. An apparatus for human fall detection capable of avoiding misjudgment when detecting a human fall, comprising:

a processor, which is a micro-processor, used to determine if the apparatus is in a proper status in the past period of time by comparing an acceleration value, which is calculated from the acceleration data in the past period of time before the collision signal is generated, with a vector component in a direction of a reference axis, and determine if a fall event occurs by comparing the acceleration data with the fall conditions set by the fall detection program; and a sensor unit, being a three-axis accelerometer operatively coupled with the processor, used to measure the acceleration data including three acceleration vector components in three axial directions correlated to the apparatus, and the acceleration value is calculated according to the three acceleration vector components; and a memory unit, operatively coupled with the processor, used to store instructions that are executed by the processor;

wherein the apparatus, which is a portable device worn on a person under care, is determined in the proper status if a difference between the acceleration value and the vector component in the direction of the reference axis is smaller than a second threshold.

6. The apparatus as recited in claim 5, further comprising: a communication unit, operatively coupled with the processor, used to transmit an alarm to a care system when detecting the fall event.

7. The apparatus as recited in claim 5, wherein the comparison executed by the gravity direction determination unit between the acceleration value and the vector component in the direction of the reference axis is used to confirm whether the apparatus correctly points to the center of Earth.

8. The apparatus as recited in claim 5, wherein, in the step executed by the processor for determining if the apparatus is in the proper status, three acceleration vector components are acquired from the acceleration data in the past period of time before the collision; the apparatus is in the proper status if a vector difference between the acceleration vector and a reference vector is smaller than a third threshold.

9. The apparatus as recited in claim 8, wherein the reference vector of the apparatus refers to a vector substantially toward the center of Earth when the apparatus rests vertically, and the vector difference between the acceleration vector and the reference vector is used to confirm whether the apparatus correctly points to the center of Earth.

* * * * *